United States Patent
Ushiyama

Patent Number: 5,289,095
Date of Patent: Feb. 22, 1994

[54] FUZZY SWITCHING LOGIC FOR SERVO SYSTEMS

[75] Inventor: Randall K. Ushiyama, Torrance, Calif.

[73] Assignee: AlliedSignal Inc, Morris Township, Morris County, N.J.

[21] Appl. No.: 819,032

[22] Filed: Jan. 10, 1992

[51] Int. Cl.[5] .............................................. G05B 11/14
[52] U.S. Cl. ..................................... 318/560; 318/597; 318/268; 318/590; 318/594
[58] Field of Search ............... 318/560, 372, 561, 597, 318/637, 268, 269, 590–597; 364/274.6

[56] References Cited

U.S. PATENT DOCUMENTS

| | | | |
|---|---|---|---|
| 3,559,018 | 9/1966 | Fournier | 318/314 |
| 3,953,774 | 4/1976 | Sato et al. | 318/594 |
| 4,223,257 | 9/1980 | Miller | 318/594 |
| 4,369,400 | 1/1983 | Turner et al. | 318/561 |
| 4,514,671 | 4/1985 | Louth | 318/603 |
| 4,532,460 | 7/1985 | Gale et al. | 318/139 |
| 4,633,404 | 12/1986 | Greeson et al. | 364/433 |
| 4,837,725 | 6/1989 | Yamakawa | 364/207 |
| 4,904,919 | 2/1990 | McNaughton | 318/798 |
| 5,019,979 | 5/1991 | Takahashi | 364/424.1 |
| 5,057,859 | 10/1991 | Ishimaru | 354/400 |
| 5,093,892 | 3/1992 | Orii | 388/815 |
| 5,111,232 | 5/1992 | Tsunefuji | 354/402 |

OTHER PUBLICATIONS

"DC Motors Speed Controlled Servo Systems" by EC ElectroCraft Corp. (1972) pp. 4-14-4-18.

Primary Examiner—William M. Shoop, Jr.
Assistant Examiner—Brian Sircus
Attorney, Agent, or Firm—Joseph R. Black; Robert A. Walsh

[57] ABSTRACT

An actuator's rate is controlled by a rate servo and the actuator's position is controlled by a position control. The position control can be a position servo or a mechanical brake. Selection of either the rate servo or position control is made by fuzzy switching logic.

19 Claims, 2 Drawing Sheets

FUZZY SWITCHING LOGIC FOR SERVO SYSTEMS

FIELD OF THE INVENTION

The present invention relates in general to servo systems and in particular to a servo system including fuzzy switching logic for switching between a rate servo and a position control.

BACKGROUND OF THE INVENTION

Servo systems are classified according to the parameter being controlled. For example, rate servos control motor rate to a given profile, position servos control angular position of the motor's shaft, and torque servos control motor torque to a commanded level.

In applications where servos are required to control electric motors that drive output shafts through reduction gears, rate servos are preferred over position servos. In general, rate servos provide smoother control than position servos. The difference in control is attributed to an integrator in the position servo. The integrator integrates angular velocity to obtain angular position. However, it also smoothes variations in angular velocity.

Despite providing smoother control, the rate servo cannot hold the commanded position of the output shaft under certain conditions. For example, once the output shaft has reached its commanded position, it can be backdriven by external loads. Backdrive generally occurs at low speeds. Because rate sensors in the rate servo cannot provide accurate measurements at low rates (e.g., a few hundred rpm), the displacement in angular position due to backdrive cannot be adequately corrected.

Backdrive can be prevented by mechanical devices such as clutches, no-backs, brakes and gearboxes having low mechanical efficiency. Once the output shaft has reached its commanded angular position, the mechanical device is enabled.

However, each of these mechanical devices has certain drawbacks. Low gearing efficiency results in greater wear and shorter life of the gearbox. Mechanical clutches and no-backs cause an increase in complexity and weight of the servo design while causing a decrease in reliability. Brakes are subject to wear. In applications requiring numerous repeated operations, the braking surfaces of the brakes must be replaced frequently.

Alternatively, backdrive can be prevented by a position servo used in conjunction with the rate servo. In general, position servos provide greater accuracy than rate servos in stopping and holding the motor at a commanded position. The resulting hybrid servo system would initially select the rate servo to slew the motor to its commanded position (rate mode), and then it would select the position servo to prevent backdrive (position mode).

Switching between the rate servo and position control can be performed by an on/off controller.

SUMMARY OF THE INVENTION

According to the present invention, the switching can also be performed by fuzzy logic. Fuzzy switching logic means selects either a rate mode or position mode. In response to the fuzzy switching logic, control means slew the actuator when the rate mode is selected and hold the position of the actuator when the position mode is selected. The control means includes servo means for slewing the actuator and position control means for holding the position of the actuator. The servo means can include a rate servo. The position control means can include, for example, a position servo or a mechanical device such as a brake.

DETAILED DESCRIPTION OF THE PREFERRED EMBODIMENT

Figure 1:
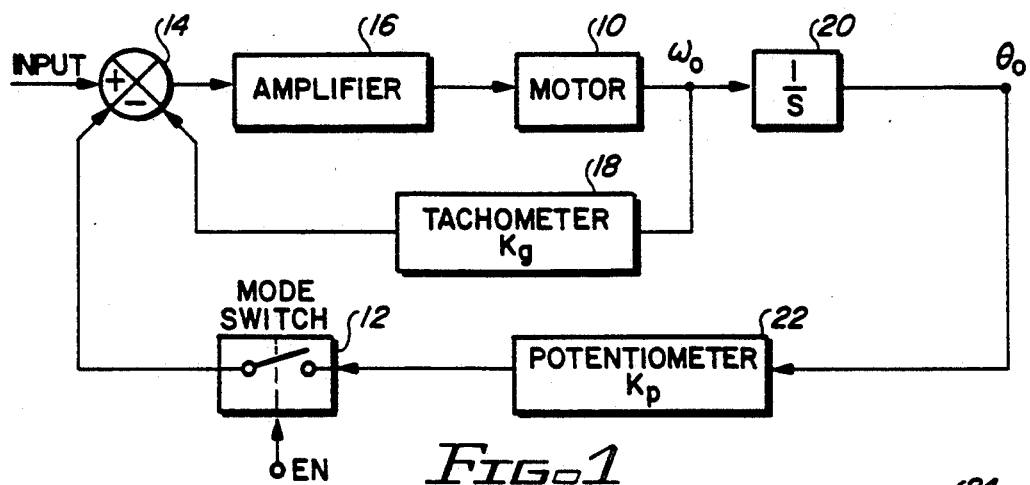
FIG. 1 is a schematic diagram of a hybrid servo for an actuator.

FIG. 1 shows a hybrid servo for an actuator such as a brushless DC motor 10. The hybrid servo includes a mode switch 12 for selecting either a rate mode or a position mode in response to a mode signal EN. When the motor 10 must be slewed to its commanded position, the mode signal EN causes the mode switch 12 to select the rate mode. In the rate mode, a rate servo including a summer 14, amplifier 16 and a tachometer transfer function 18 controls the motor rate. Once the motor 10 reaches its commanded position, the mode signal EN causes the mode switch 12 to select the position mode. In this mode, an integrator 20 and potentiometer transfer function 22 are added to the rate servo to perform position control. The integrator 20 is inherent to physical rotating systems; the integral of speed is position. Hybrid servos such as the one shown in FIG. 1 are well known to those skilled in the art.

Figure 2:
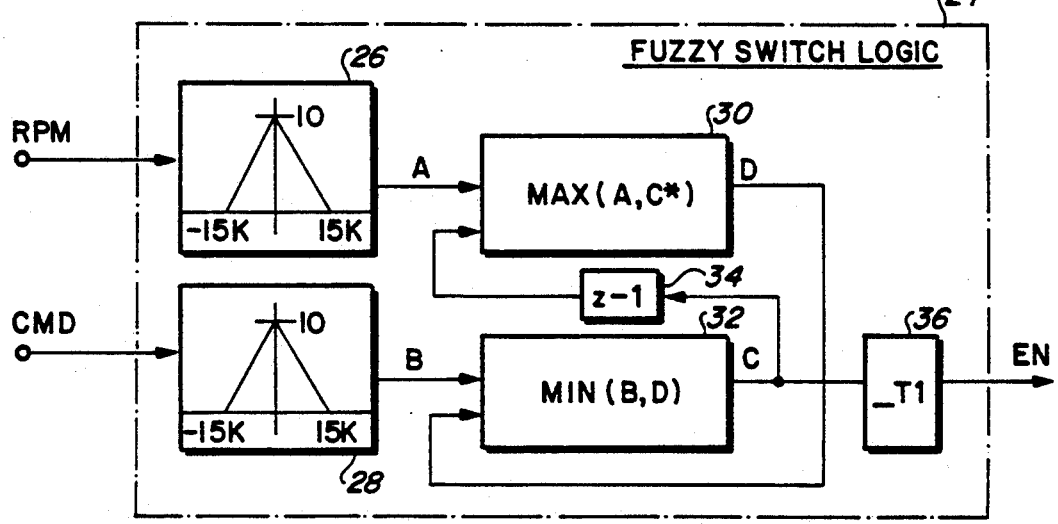
FIG. 2 is a block diagram of fuzzy switching logic according to the present invention.

Referring now to FIG. 2, the mode signal EN is supplied by fuzzy switching logic 24. The fuzzy switching logic 24 utilizes a floating criteria to determine whether the rate mode or the position mode should be selected. This determination is based upon a motor rate command CMD and a feedback signal RPM indicating motor rate. The motor rate signal RPM is supplied by a rate sensor such as a Hall effect device. The motor rate command CMD can be supplied from an external source such as an operator input or another control.

Before entering into a detailed description of the fuzzy switching logic 24, the basic concept of fuzzy logic will be explained briefly. Fuzzy logic uses graded or qualified expressions rather than expressions that are strictly true or false (boolean logic). The fuzzy logic includes possibility functions which translate a plurality of input parameters into grades of membership (e.g., from 0 to 10). Thus, these possibility functions, known as "fuzzy rules," do not have a crisply defined memberships. The graded parameters are processed by fuzzy logic operators, which determine a motion or action of the plurality of the graded input parameters. The outcome of fuzzy reasoning, determined by a defuzzifier, is not as definite as that derived by boolean logic, but rather covers a large field of discourse. Unlike the black and white world of boolean logic, the world of fuzzy logic offers shades of gray.

The fuzzy switching logic 24 includes first and second function blocks 26 and 28 which receive the motor rate signals RPM and motor rate commands CMD, respectively. The first and second function blocks 26 and 28 are programmed with possibility functions that establish fuzzy rules for the motor rate signals RPM and motor rate commands CMD. The possibility functions can be linear or non-linear. For example, linear possibility functions can be derived from the extreme corner conditions shown in Table 1.

TABLE 1

| Fnc Blk | Grade | rate |
|---|---|---|
| 26 | 0 | ±15,000 rpm |
|  | 10 | 0 rpm |
| 28 | 0 | ±15,000 rpm |
|  | 10 | 0 rpm |

The rate commands CMD and motor rate signals RPM are graded between 0 and 10 for motor rates between −15,000 rpm and 15,000 rpm. The rate of 15,000 rpm is the maximum rated speed of the motor 10.

Signals A and B indicating graded motor rate and graded motor rate command, respectively, are processed by fuzzy logic operators including a MAX block 30 and a MIN block 32. The MIN block 32 selects a minimum value (performs an "OR" function) between graded motor rate command B and an output signal D of the MAX block 30. An output signal C of the MIN block 32 indicates whether the position mode should be selected. For large motor commands CMD, output signal C will always indicate that the rate mode should be selected. A delay element 34 delays output signal C to provide a delayed signal C*, which indicates whether the position mode was previously selected. The output signal C* helps create a fuzzy region such that the fuzzy switching logic 24 must not come out of the position mode due to backdrive, but only when large motor rate commands CMD are issued. Therefore, the MAX block 30 selects a maximum value (performs an "AND" function) between graded motor rate A and the delayed signal C*. For the extreme corner conditions, output signals C and D assume the grades indicated by Table 2.

TABLE 2

| Signal | grade | cause |
|---|---|---|
| C | 0 | rate command high or (high rate and pos. mode not previously selected) |
| C | 10 | rate command low and (low rate or pos. mode previously selected) |
| D | 0 | high motor rate and pos. mode not previously selected |
| D | 10 | low motor rate or pos. mode previously selected |

A defuzzifier 36 converts output signal C into the enable signal EN, which causes the mode switch 12 to select either the position mode or the rate mode. The defuzzifier 36 compares output signal C to a threshold T1. When assigning a grade for the threshold T1, recognize that the position mode should be selected when motor rates fall below the rate sensor resolution (e.g., 300 rpm) and the motor rate command CMD has a small value. Rates below 300 rpm are within the region of sensor uncertainty, the region in which the rate servo cannot accurately position the motor 10. Further, the rate mode must be selected when the motor rate commands CMD command the motor 10 to an arbitrary rate above 300 rpm. Such an arbitrary rate can be 450 rpm. From the fuzzy rules programmed into the first and second function blocks 26 and 28, a motor rate of 450 rpm corresponds to a grade of 9.7. Therefore, the threshold T1 would be assigned a grade of 9.7. When the motor rate command CMD exceeds 450 rpm, the fuzzy switching logic 24 selects the rate mode.

However, a fuzzy region exists for motor rate commands CMD below 450 rpm. The position mode will not be selected if the position mode was not previously selected and the motor rate is high. This prevents "jerks" or "bumps" in the servo output rate. For motor rate commands CMD below 450 rpm, the fuzzy switching logic 24 must decide whether to select the rate mode or the position mode. For motor rate commands CMD below 450 rpm, the position mode will be selected if the motor rate is less than 450 rpm or if the position mode was previously selected. Thus, if the motor rate command CMD is less than 450 rpm and motor rate is also less than 450 rpm, the position mode will be selected. If, however, the motor rate command CMD is less than 450 rpm and motor rate is above 450 rpm, the position mode can still be selected if the position mode was previously selected. Thus, once the fuzzy switching logic 24 selects the position mode, the rate mode can be selected if and only if the motor rate command CMD exceeds 450 rpm. For small motor rates which may result from backdriving, the position mode will remain selected.

Figure 3:
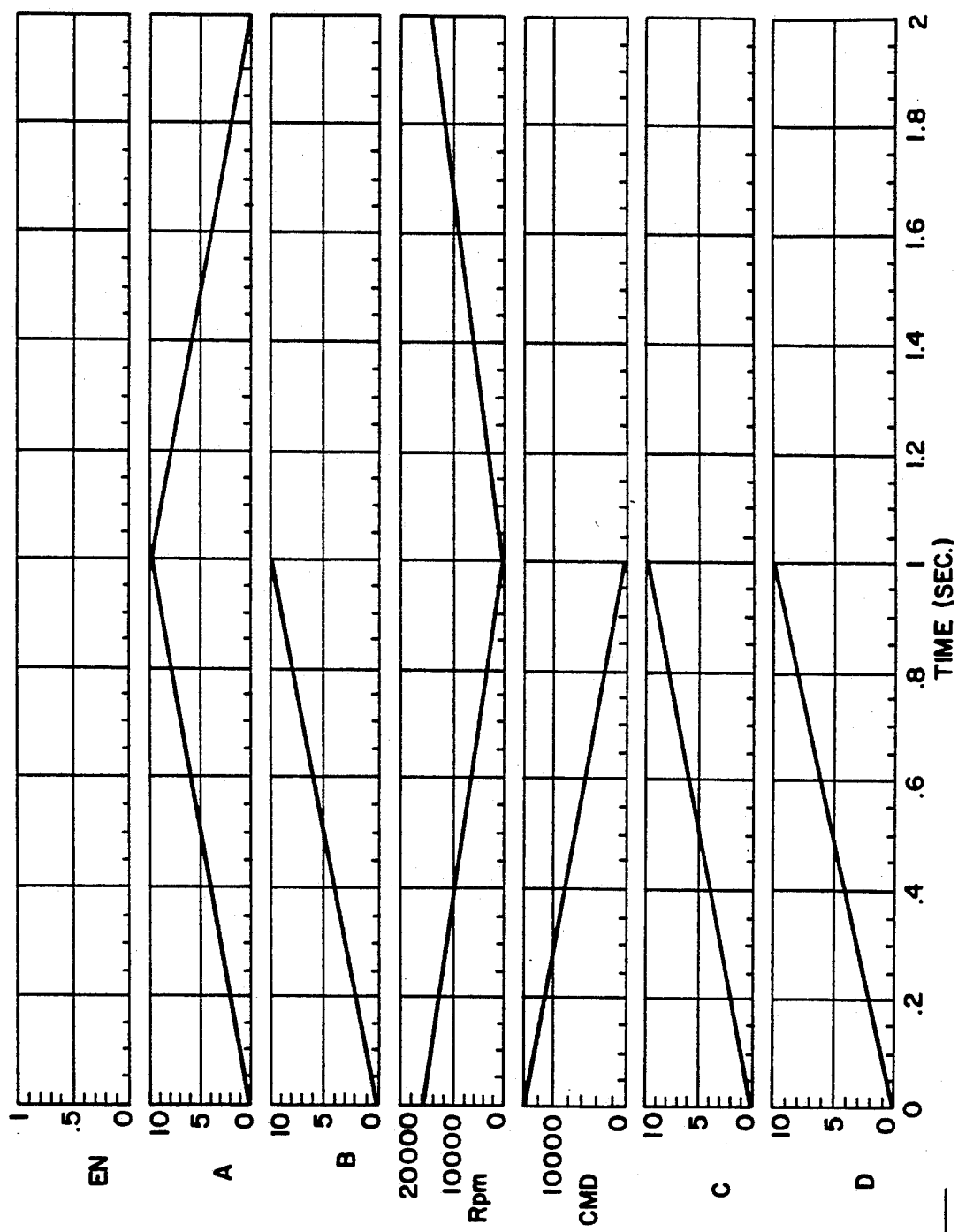
FIG. 3 shows a simulated response of the fuzzy switching logic shown in FIG. 2.

FIG. 3 shows a simulated response of the fuzzy switching logic 24 when the motor rate command CMD is ramped to zero rate. The enable signal EN selects the position mode, i.e., goes high, when the motor rate command CMD and motor rate signal RPM reach 0 rpm. Afterwards, the motor rate signal RPM is ramped upwards while the motor rate command CMD remains at 0 rpm. In the real world, this increase could be attributed to backdrive. Note, however, that the fuzzy switching logic 24 selects the position mode, i.e., the enable signal EN remains high, even when the motor rate signal RPM is increased.

Figure 4:
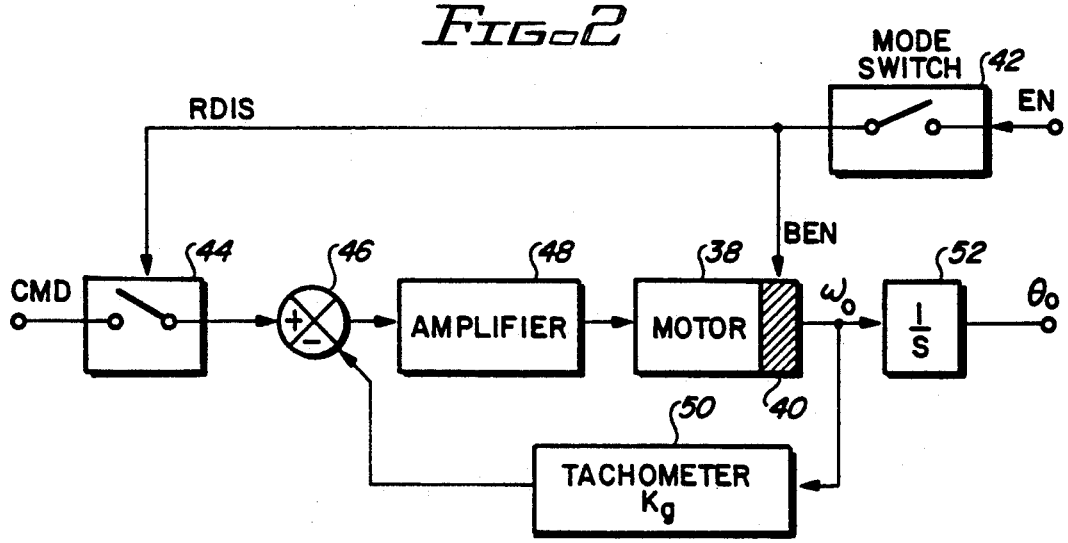
FIG. 4 is a block diagram of a rate servo and a mechanical position control for an actuator.

FIG. 4 shows another system that can be controlled by the fuzzy switching logic 24. This system includes a rate servo for slewing a motor 38 to its commanded position and a brake 40 for holding the motor 38 at its commanded position. The fuzzy switching logic 24 supplies an enable signal EN to a mode switch 42. When the enable signal EN indicates position mode, the mode switch 42 issues a rate command disable signal RDIS to a second switch 44, which disables the rate servo, and it issues a brake enable signal BEN which causes the brake 40 to hold the motor 38 at its commanded angular position.

When the enable signal EN indicates rate mode, the mode switch 42 sets the brake enable signal, which causes the brake 40 to be released, and it sets the disable signal RDIS, which causes the second switch 44 to enable the rate servo. In accordance with a motor rate command CMD, motor rate is controlled by a summer 46, an amplifier 48 and a tachometer transfer function 50. An integrator 52 integrates angular velocity to obtain angular position.

The rate servo, position servo (if employed) and fuzzy switching logic 24 can be realized by a microprocessor. Any microprocessor can be selected, and the selection of one is left to a person skilled in the art. However, if the selected microprocessor has parallel processing capability, the fuzzy rules can be processed in parallel to achieve optimum throughput. Although the rate servo, position servo and fuzzy switching logic 24 can also be realized in hardware, the software implementation is preferred since fewer components are required.

The systems shown in FIGS. 2 and 4 are especially suitable for certain robotic and automated applications. For example, these systems have application to all rate controlled valves that must hold position when subjected to external loads; and they have application to antennae that scan (slew) at low rates and periodically stop to fix on targets or other objects of interest.

It will be understood that the embodiments described herein are merely exemplary and that a person skilled in the art may make many variations and modifications without departing from the spirit and scope of the invention. For example, the fuzzy switching logic can be modified to process input parameters other than motor rate and motor rate command. All such modifications are intended to be included within the scope of the invention as defined in the appended claims.

I claim:

1. Apparatus for controlling an actuator, comprising:
   fuzzy logic means, responsive to a motor rate command and an indicated motor rate, for selecting from a plurality of modes of operation including a slewing mode and a position mode; and
   control means, responsive to said fuzzy logic means, for controlling said actuator's rate when said slewing mode is selected and for controlling said actuator's position when said position mode is selected.

2. Apparatus according to claim 1, wherein said control means includes:
   rate servo means, responsive to said fuzzy logic means, for controlling said actuator'rate; and
   position control means, responsive to said fuzzy logic means, for holding the position of said actuator.

3. Apparatus according to claim 2, wherein said position control means includes a position servo, whereby said control means is a hybrid servo.

4. Apparatus according to claim 2, wherein said position control means includes a mechanical device for holding the position of said actuator.

5. Apparatus according to claim 4, wherein said mechanical device includes a brake.

6. Apparatus according to claim 2, wherein said fuzzy logic means includes:
   fuzzy rules for grading said rate and rate command;
   operator means, responsive to said fuzzy rule means, for evaluating said graded rate and rate command; and
   defuzzifier means, responsive to said operator means, for generating an enable signal indicating whether said slewing mode or said position mode should be selected, said rate servo means and said position control means being responsive to said enable signal.

7. Apparatus according to claim 6, wherein said operator means and said defuzzifier means cooperate such that said slewing mode is selected when said graded rate command exceeds a first threshold.

8. Apparatus according to claim 7, wherein said operator means and said defuzzifier means further cooperate such that said position mode is selected when said graded command does not exceed said first threshold and said graded rate falls below a second threshold or when said graded command does not exceed said first threshold and said position mode was previously selected.

9. Apparatus according to claim 8, wherein said operator means includes:
   delay means for delaying a signal on its input;
   MAX function means for taking a maximum of said graded rate and a signal on an output of said delay means; and
   MIN function means for taking a minimum of said graded rate command and a signal on an output of said MAX function means, one output of said MIN function means being coupled to said input of said delay means, another output of said MIN function means being coupled to an input of said defuzzifier means.

10. Apparatus according to claim 9, wherein said second threshold equals said first threshold, and wherein said defuzzifier means includes comparing means for comparing a first signal on said output of said MIN function means to said first threshold, said defuzzifier means selecting said slewing mode when said first signal is greater than said first threshold, said defuzzifier means selecting said position mode when said first signal is less than said first threshold.

11. Apparatus according to claim 8, wherein said rate is indicated by sensor means having a resolution at a third threshold, and wherein said second threshold is set above said third threshold.

12. Apparatus for controlling an actuator, comprising:
   rate servo means, responsive to an enable signal, for controlling said actuator's rate in accordance with a rate command;
   position control means, responsive to said enable signal, for holding the position of said actuator; and
   fuzzy logic means, responsive to said actuator rate and said actuator rate command, for generating said enable signal, which indicates whether said rate servo means or said position control means should be selected to control said actuator.

13. Apparatus according to claim 12, wherein said position control means includes position servo means, whereby said rate servo means and said position servo means are a hybrid servo.

14. Apparatus according to claim 12, wherein said position control means includes a mechanical device for holding the position of said actuator.

15. Apparatus according to claim 12, wherein said fuzzy logic means includes fuzzy rule means for grading said motor rate and said actuator rate commands; and means for issuing said enable signal when said graded rate command exceeds a first threshold, when said graded command does not exceed said first threshold but said graded rate falls below a second threshold, or when said graded command does not exceed said first threshold but said position control means was previously selected.

16. Apparatus according to claim 15, wherein said actuator rate is indicated by sensor means having a resolution at a third threshold, and wherein said second threshold is set above said third threshold.

17. Apparatus for selecting a mode of operation for an actuator, said modes including a slewing mode and a position mode, said apparatus comprising:
   fuzzy rule means for grading at lest two criteria of said actuator, said criteria including rate and a rate command;
   operator means, responsive to said fuzzy rule means, for evaluating said graded criteria; and
   defuzzifier means, responsive to said operator means, for generating an enable signal indicating the mode to be selected, said slewing mode being selected when said graded rate command exceeds a first threshold, said position mode being selected when said graded command does not exceed said first threshold and said graded rate falls below a second threshold or when said graded rate command does not exceed said first threshold and said position mode was previously selected.

18. Apparatus according to claim 17, wherein said operator means includes:
   delay means for delaying a signal on its input;
   MAX function means for taking a maximum of said graded rate and a signal on an output of said delay means; and
   MIN function means for taking a minimum of said graded rate command and a signal on an output of said MAX function means, one output of said MIN function means being coupled to said input of said delay means, another output of said MIN function means being coupled to an input of said defuzzifier means.

19. Apparatus according to claim 18, wherein said first and second thresholds are equal, and wherein said defuzzifier means includes comparing means for comparing a first signal on said output of said MIN function means to said first threshold, said defuzzifier means selecting said slewing mode when said first signal is greater than said first threshold, said defuzzifier means selecting said position mode when said first signal is less than said first threshold.

* * * * *